(12) United States Patent
Vander Sluis et al.

(10) Patent No.: US 9,910,493 B2
(45) Date of Patent: Mar. 6, 2018

(54) SUSPENSION COMPONENT FOR A HAPTIC TOUCH PANEL ASSEMBLY

(71) Applicant: Faurecia Interior Systems, Inc., Auburn Hills, MI (US)

(72) Inventors: Daniel R. Vander Sluis, Rochester Hills, MI (US); Jay W. Hotchkiss, Rochester Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 530 days.

(21) Appl. No.: 14/535,747

(22) Filed: Nov. 7, 2014

(65) Prior Publication Data
US 2016/0132112 A1    May 12, 2016

(51) Int. Cl.
| | |
|---|---|
| *B60K 37/06* | (2006.01) |
| *G06F 3/01* | (2006.01) |
| *G06F 3/041* | (2006.01) |
| *G06F 3/0354* | (2013.01) |
| *G06F 1/16* | (2006.01) |

(52) U.S. Cl.
CPC .............. *G06F 3/016* (2013.01); *G06F 1/16* (2013.01); *G06F 3/03547* (2013.01); *G06F 3/041* (2013.01); *G06F 1/1643* (2013.01)

(58) Field of Classification Search
CPC ... B60K 37/06; Y10T 403/45; Y10T 403/455; Y10T 403/457; Y10T 403/32008; Y10T 403/32041; Y10T 403/32541; Y10T 403/32614; A63F 13/2145; A63F 13/285; G06F 3/0414
See application file for complete search history.

(56) References Cited

U.S. PATENT DOCUMENTS

| | | | |
|---|---|---|---|
| 3,183,731 A | * | 5/1965 | Dolza ............... F16H 7/023 464/84 |
| 5,889,672 A | | 3/1999 | Schuler et al. |
| 6,275,213 B1 | | 8/2001 | Tremblay et al. |
| 6,424,333 B1 | | 7/2002 | Tremblay et al. |
| 6,429,846 B2 | | 8/2002 | Rosenberg et al. |

(Continued)

FOREIGN PATENT DOCUMENTS

| | | |
|---|---|---|
| CN | 101359264 A | 2/2009 |
| DE | 102008051155 A1 | 4/2010 |

(Continued)

OTHER PUBLICATIONS

Extended European Search Report corresponding to EP application No. 15193563, dated Feb. 12, 2016, 9 pages.

(Continued)

*Primary Examiner* — Michael P Ferguson
(74) *Attorney, Agent, or Firm* — Reising Ethington P.C.

(57) ABSTRACT

A suspension component for coupling a touch panel to a substrate in a haptic touch panel assembly. The suspension component includes a flexible connector that extends between a first end adapted for attachment to the touch panel and a second end adapted for attachment to the substrate. The flexible connector includes a concave section, an axial side wall, and a mobility gap and is shaped to allow the touch panel to move with respect to the substrate with three or more degrees of freedom, thereby facilitating more accurate and dynamic haptic feedback.

18 Claims, 6 Drawing Sheets

(56) References Cited

U.S. PATENT DOCUMENTS

| | | | |
|---|---|---|---|
| 7,592,999 B2 | 9/2009 | Rosenberg et al. | |
| 7,733,575 B2 * | 6/2010 | Heim | G02B 3/14 359/665 |
| 7,834,857 B2 * | 11/2010 | Prados | B60K 35/00 345/173 |
| 7,969,288 B2 | 6/2011 | Braun et al. | |
| 7,982,720 B2 | 7/2011 | Rosenberg et al. | |
| 7,999,660 B2 | 8/2011 | Cybart et al. | |
| 8,031,181 B2 | 10/2011 | Rosenberg et al. | |
| 8,059,105 B2 | 11/2011 | Rosenberg et al. | |
| 8,144,453 B2 | 3/2012 | Brown et al. | |
| 8,531,407 B2 | 9/2013 | Tanaka et al. | |
| 8,629,954 B2 | 1/2014 | Olien et al. | |
| 8,780,543 B2 | 7/2014 | Mölne et al. | |
| 8,834,027 B2 * | 9/2014 | Zeidan | F16F 15/1215 384/117 |
| 2005/0225539 A1 | 10/2005 | Prados | |
| 2006/0071901 A1 | 4/2006 | Feldman | |
| 2006/0126190 A1 * | 6/2006 | Berge | G02B 26/005 359/665 |
| 2006/0256075 A1 | 11/2006 | Anastas et al. | |
| 2007/0057927 A1 | 3/2007 | Prados | |
| 2007/0236474 A1 | 10/2007 | Ramstein | |
| 2008/0143559 A1 | 6/2008 | Dietz et al. | |
| 2010/0060437 A1 | 3/2010 | Steckel et al. | |
| 2010/0238053 A1 | 9/2010 | Schmidt et al. | |
| 2011/0242014 A1 | 10/2011 | Tsai et al. | |
| 2012/0038568 A1 | 2/2012 | Colloms et al. | |
| 2012/0038577 A1 | 2/2012 | Brown et al. | |
| 2012/0120010 A1 | 5/2012 | Yu et al. | |
| 2012/0200789 A1 | 8/2012 | Mölne et al. | |
| 2012/0286847 A1 | 11/2012 | Peshkin et al. | |
| 2012/0326999 A1 | 12/2012 | Colgate et al. | |
| 2013/0100046 A1 | 4/2013 | Chuang et al. | |
| 2013/0314867 A1 | 11/2013 | Liu | |
| 2014/0139452 A1 | 5/2014 | Levesque et al. | |
| 2014/0176462 A1 | 6/2014 | Ponziani | |
| 2015/0145783 A1 | 5/2015 | Redelsheimer et al. | |
| 2016/0132113 A1 | 5/2016 | Hotchkiss et al. | |

FOREIGN PATENT DOCUMENTS

| | | |
|---|---|---|
| JP | H04129115 A | 4/1992 |
| WO | WO2013068651 A2 | 5/2013 |
| WO | WO2013160560 A9 | 10/2013 |

OTHER PUBLICATIONS

Extended European Search Report corresponding with application No. EP15193564, dated Mar. 15, 2016, 12 pages.

* cited by examiner

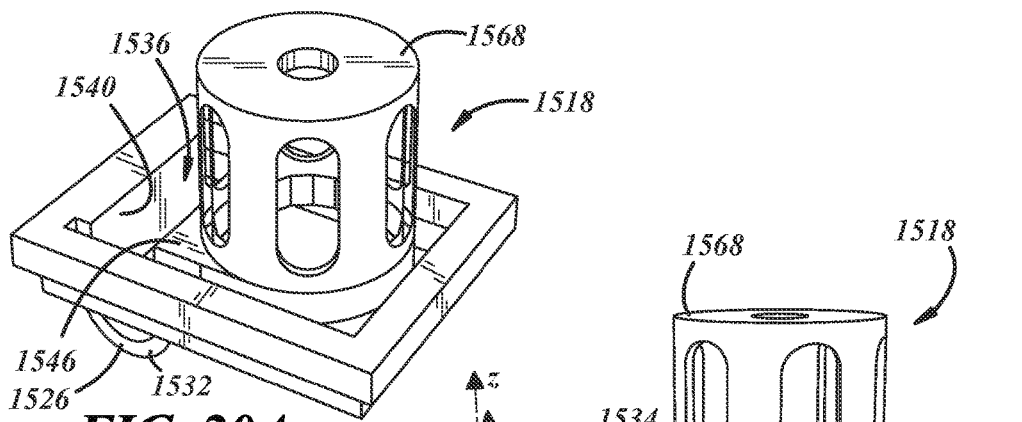
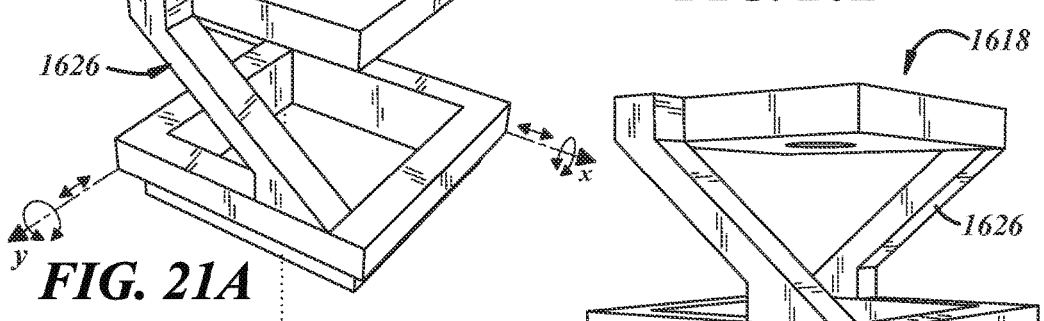
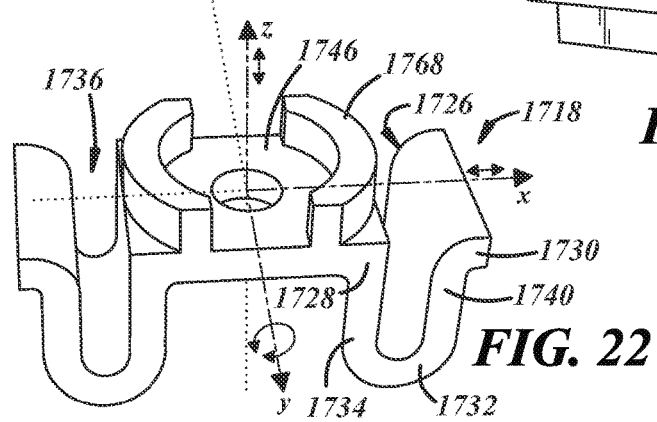

SUSPENSION COMPONENT FOR A HAPTIC TOUCH PANEL ASSEMBLY

TECHNICAL FIELD

The present disclosure relates generally to haptic touch panel assemblies and, more particularly, to suspension components for haptic touch panel assemblies that facilitate multiple degrees of freedom (DOF) haptic feedback.

BACKGROUND

The proliferation of touch panel assemblies, such as those that incorporate a graphical user interface in lieu of devices that employ traditional push button assemblies and/or other assemblies that require more manual user input, has coincided with a need to provide the user with haptic feedback. Haptic feedback may include vibration or other movement that can be detected by as user's sense of touch. The haptic feedback provided by touch panel assemblies can enhance the user's experience by confirming activation of a certain command or providing sensations that better coincide to images on a graphical user interface display, for example. Combinations of actuators and suspension components may be used to facilitate relative movement of touch panel assembly components. Conventional suspension components such as leaf springs and cantilevers provide only one degree of freedom of movement, which limits haptic feedback to simple movement in one direction so that all feedback sensations feel the same to the user.

U.S. Pat. No. 8,629,954 by Olien et al. discloses several embodiments of grommet suspension components for use with touch screen assemblies. These grommet suspension components are mounted to a rigid housing and have lumens configured to receive posts or other coupling means of the touch screen assembly. Each of the disclosed grommet suspension components is specifically designed to allow movement or the touch screen assembly in one direction while limiting movement in other directions.

SUMMARY

In accordance with one embodiment, a suspension component for coupling a touch panel to a substrate in a haptic touch panel assembly includes at least one flexible connector extending between a first end adapted for attachment to the touch panel and a second end adapted for attachment to the substrate. At least a portion of the touch panel is spaced from the substrate in an axial direction. Each flexible connector includes an axially-facing concave section and an axial side wall extending between the concave section and one of the ends. A mobility gap is defined between the axial sidewall and the other one of the ends, and the at least one flexible connector is shaped to allow the touch panel to move with three or more degrees of freedom with respect to the substrate when coupled by the suspension component.

In one or more embodiments, each concave section is a U-shaped portion having an open end facing in an axial direction.

In one or more embodiments, each flexible connector includes a stabilizing portion between the concave section and the second end.

In one or more embodiments, the concave section is a U-shaped portion having an open end facing in an axial direction, and the stabilizing portion includes a U-shaped portion having an open end facing in an opposite axial direction.

In one or more embodiments, the concave section includes a nadir, the stabilizing portion includes an apex, and the nadir and apex are equidistant from the second end.

In one or more embodiments, the concave section includes a nadir and the axial distance between the first end and the second end is greater than the axial distance between the nadir and the second end.

In one or more embodiments, each flexible connector includes a second axial side wall between the concave section and said other one of the ends such that the axial side walls are spaced apart in a transverse direction by the concave section to define the mobility gap.

In one or more embodiments, at least a portion of each flexible connector lies outside an axial region defined between the first and second ends of the flexible connector.

In one or more embodiments, each concave section includes a nadir that lies outside the axial region.

In one or more embodiments, the suspension component includes a circular touch panel interface at the first end. The axial side wall extends between the concave section of the flexible connector and the touch panel interface and around the perimeter of the touch panel interface.

In one or more embodiments, the suspension component includes a plurality of stabilizing portions spaced about the touch panel interface and between the concave section and the second end.

In one or more embodiments, the suspension panel includes a touch panel interface, wherein the first end of a first flexible connector is located along one side of the touch panel interface and the first end of a second flexible connector is located along another side of the touch panel interface.

In one or more embodiments, each flexible connector includes a stabilizing portion between the respective concave sections and second ends.

In one or more embodiments, the flexible connector is made from polyoxymethylene, nylon, or polycarbonate/acrylonitrile butadiene styrene.

In one or more embodiments, the at least one flexible connector is shaped to allow the touch panel to move with five or more degrees of freedom with respect to the substrate when coupled by the suspension component.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more preferred exemplary embodiments of the invention will hereinafter be described in conjunction with the appended drawings, wherein like designations denote like elements, and wherein:

FIGS. 20A and 20B show a suspension component in accordance with one embodiment;

FIGS. 21A and 21B show a suspension component in accordance with another embodiment; and FIG. 22 is a perspective view of another embodiment of the suspension component.

DETAILED DESCRIPTION OF ILLUSTRATIVE EMBODIMENT(S)

As will become apparent from the following disclosure, the suspension components described herein can assist in providing a haptic touch panel assembly with different types of haptic feedback to facilitate a more accurate and/or dynamic haptic feedback response. The suspension components can provide multiple degrees of freedom of relative movement among touch panel assembly components. An adequate balance of suspension component stiffness and motion displacement is required to properly provide and control the haptic feedback response. Haptic touch panel assemblies with one or more of these suspension components may be incorporated into computers, tablets, phones, vehicle interior displays, or any other device or structure that may benefit from haptic feedback. The multiple degrees of freedom of relative movement of touch panel assembly components enabled by the suspension components described below facilitates delivery of multiple different types of haptic feedback to the user. This ability to communicate information to the user through the sense of touch may be particularly useful in applications where the user's other senses are focused on other tasks, such as driving. FIGS. 1-22 are representative of an array of possible suspension component designs in accordance with various embodiments. It should be noted that the appended drawings are not necessarily to scale.

Figure 1:
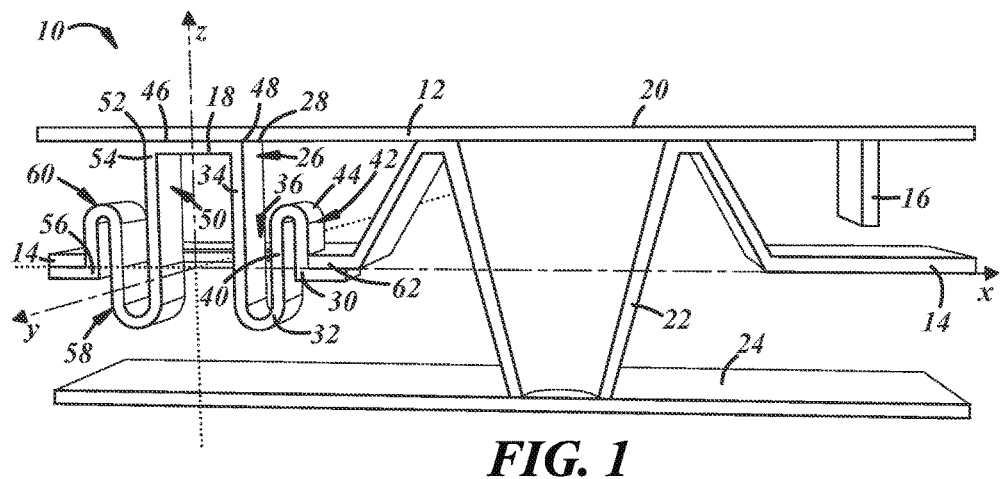
FIG. 1 is a schematic, cross-sectional view of a touch panel assembly that includes a suspension component in accordance with one embodiment.

Referring now to FIG. 1, a schematic, cross-sectional view of a haptic touch panel assembly 10 is shown. The illustrated haptic touch panel assembly 10 includes a touch panel 12, a substrate 14, a haptic actuator 16 attached to the touch panel, and a suspension component 18 that couples the touch panel and the substrate in a manner that permits multiple degrees of freedom of relative movement. The touch panel 12 may include a graphical user interface display 20. In this example, the substrate 14 is in the form of a light guide 22 that directs light from a printed circuit board (PCB) 24 to the touch panel. The touch panel assembly 10 may include other components not shown in FIG. 1, such as various fixture elements, gaskets and/or dust seals, guiding or locating elements haptic feedback isolators (e.g. foam pieces), a power source, sensors, buttons, processors, microcontrollers, drivers, software, and/or communication devices to cite a few possibilities. Moreover, the suspension components described herein may be used in haptic touch panel assemblies that vary in arrangement from that shown in FIG. 1. For example, it is possible to integrate the PCB 24 with the substrate 14 to help reduce the overall axial dimensions of the assembly 10. Other haptic touch panel assembly components, arrangements, and architectures are certainly possible.

The touch panel 12 allows a user to receive haptic feedback in response to various inputs, such as through the graphical user interface or other display 20. For example, if the haptic touch panel assembly is incorporated as part of a vehicle interior panel, a graphical user interface may display on/off buttons that provide haptic feedback in the axial or z-direction (i.e., normal to the plane of the touch panel) or sliding volume controls that provide haptic feedback in the x- and y-directions, to cite a few possibilities. Numerous other styles of input as well as directions and types of haptic feedback may be facilitated by the suspension components described herein. The term "touch panel" is meant to include any component including a haptic feedback surface, including but not limited to, capacitive or non-capacitive touch screens, touch panels, touch pads, rotary dials, joysticks, etc., with or without a graphical user interface display.

The touch panel 12 moves in relation to the substrate 14 to provide the haptic feedback response, and activation of the haptic actuator 16 initiates touch panel movement. The substrate 14 may be integrated with a larger device or system, such as the exemplary vehicle interior panel described above. Typically, although not necessarily, the substrate 14 remains relatively stationary while haptic feedback is provided through the touch panel 12 via the haptic actuator 16.

The haptic actuator 16 may include any suitable actuator, such as an eccentric rotating mass (ERM), a linear resonant actuator (LRA), a linear solenoid, a piezo actuator, an electro-active polymer (EAP), or the like. The haptic touch panel assembly 10 may include multiple haptic actuators, and may also include foam, spacers, or other components to isolate haptic feedback in particular locations. Moreover, it is possible to use different types of actuators in the same haptic touch panel assembly to provide varying types of haptic feedback. In one embodiment, for example, a linear solenoid may be used to provide haptic feedback in the z-direction by actuating in a direction normal to the surface of the touch panel, while a piezo actuator may be used to provide haptic feedback in the x-direction or y-direction by actuating in a direction in line with the surface of the touch panel. The haptic actuator may produce touch panel movement with a variety of different waveform profiles. Various types, quantities, and arrangements of haptic actuators can be combined with the multiple degrees of freedom (DOF)

provided by the suspension component 18 to generate a large variety of different haptic feedback responses.

Figure 2:
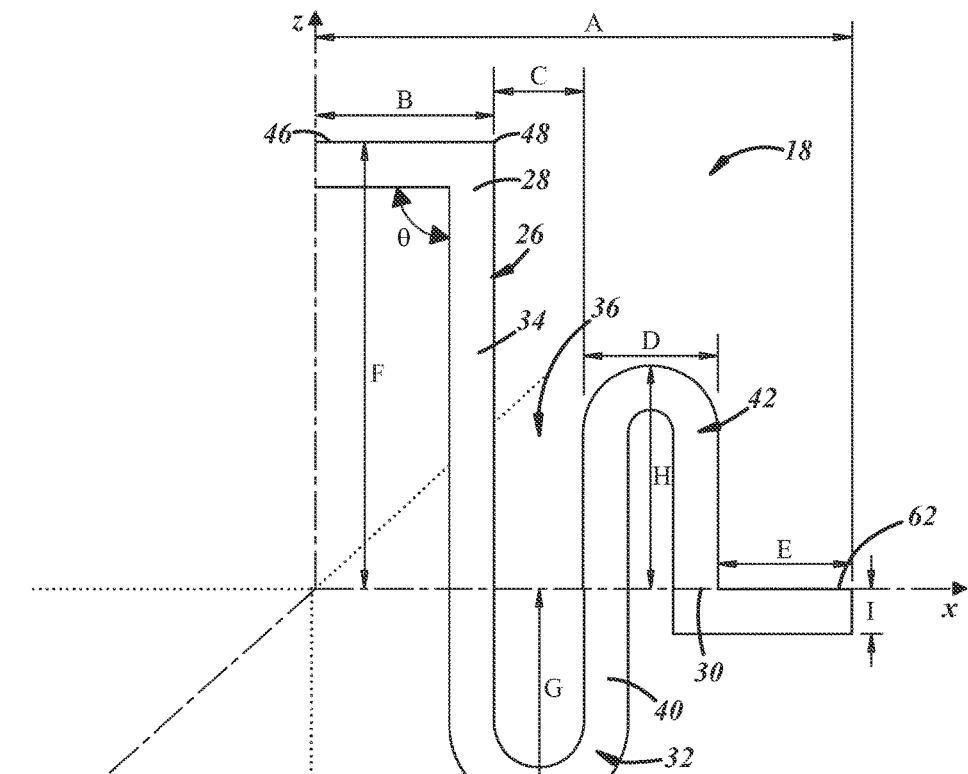
FIG. 2 is a partial, cross-sectional view of the suspension component of FIG. 1 and is also representative of the suspension components shown in FIGS. 3-7.
Figure 3:
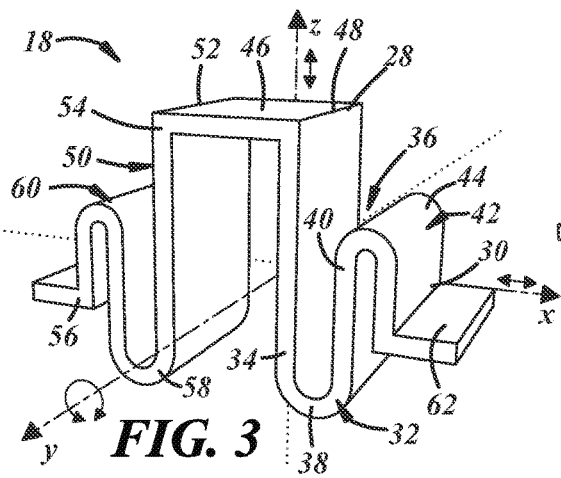
FIG. 3 is a perspective view of the suspension component of FIG. 1.

FIGS. 1-3 show various views of the suspension component 18 in accordance with one embodiment. The suspension component 18 includes a flexible connector 26 extending between a first end 28 adapted for attachment to the touch panel 12 and a second end 30 adapted for attachment to the substrate 14. At least a portion of the touch panel 12 is spaced from the substrate 14 in an axial direction which is generally defined by the Z axis. The flexible connector 26 includes an axially-facing concave section 32 that is shaped to allow the first end 28 to move with respect to the second end 30 with three or more degrees of freedom. Each degree of freedom (DOF) is either translational or rotational and is shown in the figures as an arrow extending along or around the X-, Y-, and Z-axes. In FIG. 3, for example, the suspension component 18 allows three DOF movement: along the X axis, rotationally around the Y axis, and along the Z axis.

The flexible connector 26 includes an axial side wall 34 extending between the concave section 32 and one of the ends, such as the first end 28 as shown in FIGS. 1-3. The flexible connector 26 further defines a mobility gap 36 between the axial side wall 34 and the other end 30 of the connector. The axial side wall may instead extend between the concave section 32 and the second end 30, with the mobility gap 36 situated between the axial side wall and the first end 28. The mobility gap 36 may assist in facilitating the three DOF movement. The flexible connector 26 may optionally include a second axial side wall 40 between the concave section 32 and the second end 30, as shown. The axial side walls 34, 40 are spaced apart by the concave section 32 in a direction transverse to the axial direction. In FIGS. 1-3 this transverse direction is generally defined by the X axis. This transverse spacing generally coincides with the mobility gap 36.

The flexible connector 26 may be made from a polymer or polymer-based material. In one embodiment, the connector 26 is made from a material consisting essentially of a polymer. In another particular embodiment, the flexible connector 26 may be made from polyoxymethylene (POM) or a material consisting essentially of POM. The flexible connector 26 may also be made from nylon or polycarbonate/acrylonitrile butadiene styrene (PC/ABS). The polymeric material may help to facilitate the multiple DOF movement between the first end and the second end via its flexibility. Upon actuation of the touch panel, it is possible for the size of the mobility gap 36 to vary. For example, actuation along the X axis and rotationally about the Y axis may cause the size of the mobility gap 36 to increase or decrease, depending on the direction of movement. Some movement, such as actuation along the Z axis for example, may not cause a corresponding increase or decrease in the size of the mobility gap 36.

The concave section 32 of the flexible connector 26 may include a nadir or lowest portion. In the illustrated embodiment, the concave section 32 is a U-shaped portion that includes the nadir 38, and an open end of the U-shaped portion faces in the axial direction. More particularly, the nadir 38 in this embodiment is the lowest point on the concave section 32 between the axial side walls 34, 40. The nadir 38 need not be included in a U-shaped portion and could instead be included in many other shapes and configurations. Moreover, it should be understood that the concave section 32 may include any curved portion or shape, such as a squared-off U-shape, a V-shape, or shapes that include various other protrusions, for example.

The suspension component 18 may also include a stabilizing portion 42, as shown in FIGS. 1-3. The illustrated stabilizing portion 42 is located between the concave section 32 and the second end 30 and extends between the second axial side wall 40 and the second end 30 in this example. The stabilizing portion 42 may include an apex 44 in a second concave section of the flexible connector 18, as shown. Similar to the nadir 38, the apex 44 may be located at a U-shaped portion with an open end of the U-shaped portion facing in the axial direction. In this example, each of the two U-shaped portions have their respective open ends facing in opposite axial directions toward one another. The stabilizing portion 42 and the apex 44 may alternatively be made in various other shapes or configurations besides that shown in FIGS. 1-3.

The suspension component 18 may further include a touch panel interface 46 located at the first end 28. The touch panel interface 46 may facilitate attachment of the suspension component 18 to the touch panel 12. While FIG. 1 shows the touch panel interface 46 in direct contact with the touch panel 12, it should be understood that various spacers or other components may be included to facilitate an indirect attachment of the touch panel interface of the suspension component and the touch panel. Any suitable attachment means may be used to attach the touch panel and the touch panel interface, including adhesive, welds, or mechanical fasteners such as screws, nuts, bolts, snaps, etc., to name a few possibilities.

With reference to FIG. 3, the touch panel interface 46 is a polygonal touch panel interface with the first end 28 of the flexible connector 26 located along one side 48 of the touch panel interface 46. The illustrated touch panel interface 46 is square-shaped; however, any polygonal shape is possible. A polygonal shape may include any closed plane figure having three or more sides. The particular embodiment of FIGS. 1-3 further includes at least one additional flexible connector, such as flexible connector 50. The illustrated flexible connector 50 is located along another side 52 of the touch panel interface 46. The flexible connector 50 extends from a first end 54 adapted for attachment to the touch panel 12 to a second end 56 adapted for attachment to the substrate 14. The flexible connector 50 includes an axially-facing concave section 58, and may optionally include the additional features discussed with reference to the flexible connector 26, such as a stabilizing portion 60 between the second end 56 and the concave section 58. In this example, the flexible connectors 26, 50 are a substantially identical pair oriented symmetrically with respect to the Y-Z plane with respective first ends 28, 54 located along opposite sides of the square-shaped touch panel interface 46.

Each flexible connector 26, 50 of the suspension component 18 may also include a substrate interface 62 located at the second end 40, 56. The substrate interface 62 may facilitate attachment of the suspension component 18 to the substrate 14. Similar methods of direct or indirect attachment as described with relation to the touch panel interface 46 may be used to attach the substrate interface 62, such as an adhesive, weld, mechanical fasteners, any combination thereof, or any other suitable method of attachment. As shown in FIG. 1, portions of the substrate 14 may be cut-out or otherwise removed to allow proper placement of the suspension component 18. In this example, opposite axial regions of the suspension component are located on opposite sides of the substrate 14. The substrate interface 62 is not necessary, as it may be possible in some embodiments to form the second end of the flexible connector directly with the substrate so as to form a molded-in or integral suspension component.

With reference to FIG. 2, the suspension component 18 may be characterized by a number of dimensions A-I. It should be noted that the partial, cross-sectional view of FIG. 2 is generally representative of the suspension components shown in FIGS. 1 and 3-7. An angle θ is formed between the touch panel interface 46 (or the X-axis) and the axial side wall 34 of the flexible connector 26. In this embodiment the angle θ is approximately 90°. Dimensions A-E are transverse length dimensions of the suspension component, where dimension A is the sum of dimensions B-E. In one non-limiting example with the approximate proportions of FIG. 2, dimension A is approximately 12 mm, dimension B is approximately 4 mm, dimension C is approximately 2 mm, dimension D is approximately 3 mm, and dimension E is approximately 3 mm. Dimension A represents half of the transverse length of the suspension component 18. Dimension B represents half of the transverse length of the touch panel interface 46. Dimension C is representative of the transverse length of the mobility gap 36, which in this particular embodiment, is defined between axial side walls 34, 40. Dimension D represents the transverse length of the stabilizing protrusion 42, and dimension E represents the transverse length of the substrate interface 62.

Dimensions F-I are axial dimensions of the suspension component 18. In the non-limiting example with the approximate proportions of FIG. 2, dimension F is approximately 10 mm, dimensions G and H are each approximately 5 mm, and dimension I is approximately 1 mm. Dimension I in this example may also be considered the wall thickness of the flexible connector 26, which is generally constant between the first and second ends 28, 30, and of the suspension component 18, which is generally constant between the two interfaces 46, 62. Dimension F is the axial distance from the first end 28 to the second end 30 of the flexible connector 26 and defines a first axial region between the two ends 28, 30. Dimension G is the axial distance from the nadir 38 of the concave section 32 to the second end 30, and generally defines a second axial region outside of and adjacent to the first axial region. Accordingly, the concave section 32 lies in the second axial region outside of the first axial region defined between the first and second ends of the flexible connector 26. In some embodiments, at least a portion of the flexible connector lies outside of the first axial region. Dimension H is the axial distance from the apex 44 of the stabilizing protrusion 42 to the second end 30 of the flexible connector 26.

Certain dimensional relationships may assist in providing adequate stiffness of the suspension component while simultaneously facilitating movement. For example, the axial distance from the nadir 38 to the second end 30 may be the same as the axial distance from the apex 44 to the second end 30 (i.e., G=H). In another example, the axial distance between the first end 28 and the second end 30 is greater than the axial distance between the nadir 38 and the second end 30 (i.e., F>G). Other dimensional relationships may exist, such as having the transverse length of the stabilizing protrusion 42 equal the transverse length of the substrate interface 62 (e.g., dimension D equals dimension E), to cite one example.

Various other suspension component embodiments will be described with reference to FIGS. 4-22, where multiple of 100 are added to the reference numerals of like components of FIGS. 1-3 (e.g., suspension component 18 of FIGS. 1-3, suspension component 118 of FIG. 4, suspension component 218 of FIGS. 5A and 5B, etc.). For the sake of clarity, some reference numerals are omitted.

Figure 4:
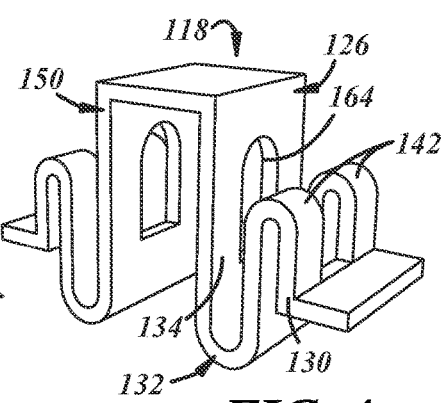
FIG. 4 is a perspective view of a suspension component in accordance with one embodiment.

FIG. 4 shows a suspension component 118 in accordance with one embodiment. The suspension component 118 includes a window 164 formed through the axial side wall 134 of the flexible connector 126. Each of the two flexible connectors 126, 150 further includes two stabilizing protrusions 142 between the concave section 132 and the second end 130. The absence of suspension component material between each pair of stabilizing protrusions 142 may reduce the stiffness of the suspension component compared with the embodiment of FIGS. 1-3 when particularly directed forces are applied, which may accordingly increase or otherwise alter the haptic feedback response.

Figure 5A:
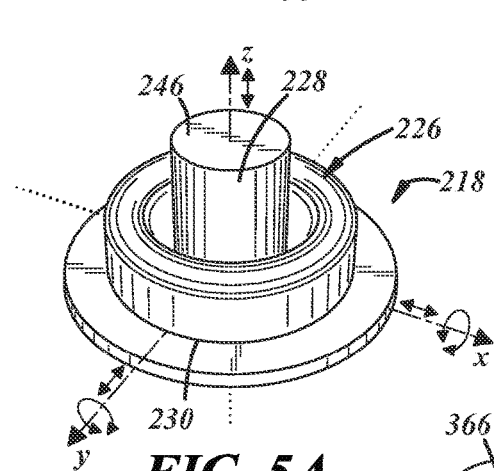
FIGS. 5A and 5B show a suspension component in accordance with another embodiment.
Figure 5B:
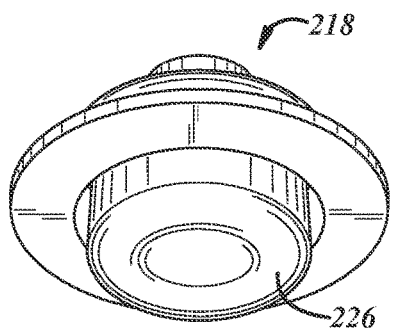

FIGS. 5A and 5B show two views of another example of a suspension component 218. The illustrated suspension component 218 includes a circular touch panel interface 246 at the first end 228 of the flexible connector 226. The illustrated embodiment includes one flexible connector 226 that extends circumferentially and continuously around the circular touch panel interface 246 and around the Z axis. As represented by the arrows, this suspension component may facilitate five DOF movement of the first end 228 with relation to the second end 230: along the X axis, around the X axis, along the Y axis, around the Y axis, and along the Z axis.

Figure 6:
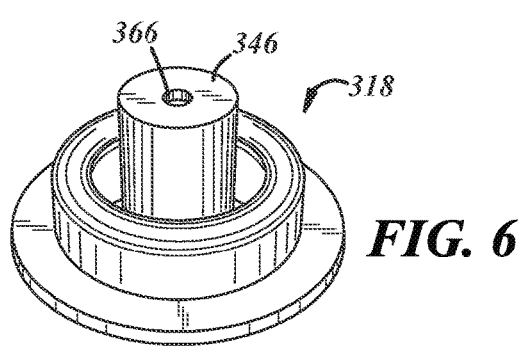
FIG. 6 is a perspective view of a suspension component in accordance with one embodiment.

The suspension component 318 of FIG. 6 is similar to the suspension component 218, but further includes a fastening hole 366 in the circular touch panel interface 346 that may be used to accommodate a screw or other fastening device.

Figure 7A:
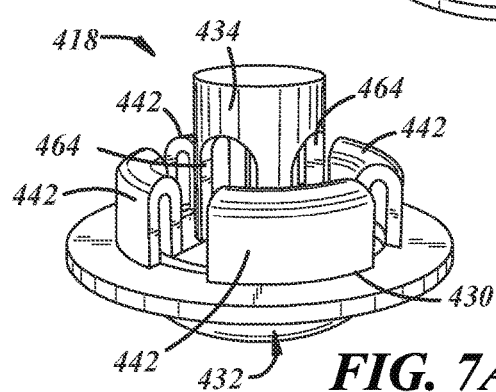
FIGS. 7A and 7B show a suspension component in accordance with another embodiment.
Figure 7B:
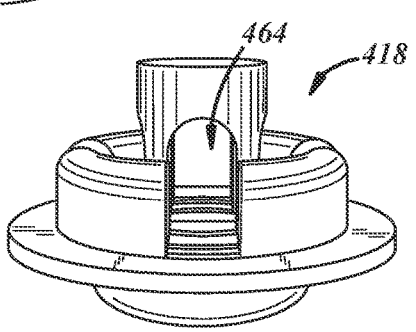

The suspension component 418 of FIGS. 7A and 7B are similar to the suspension components 218, 318, but further includes a plurality of windows 464 in the axial side wall 434 and a corresponding plurality of stabilizing protrusions 442 between the second end 430 and the concave section 432.

Figure 8:
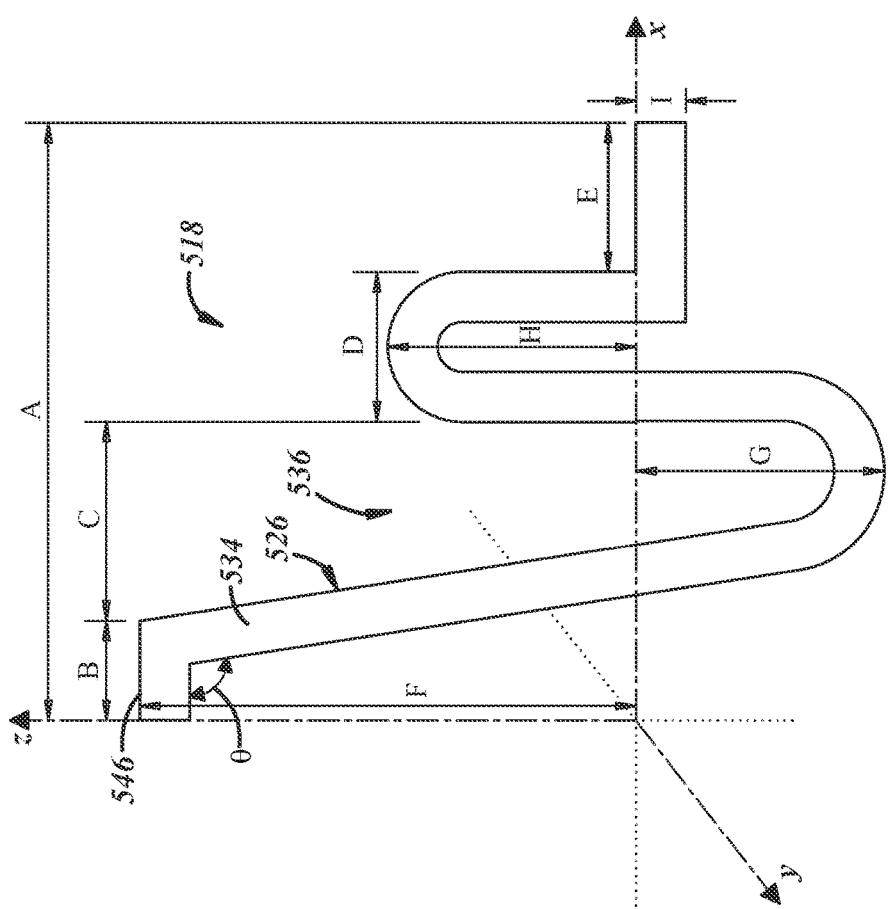
FIG. 8 is a partial, cross-sectional view representative of the suspension components shown in FIGS. 9-13.
Figure 9A:
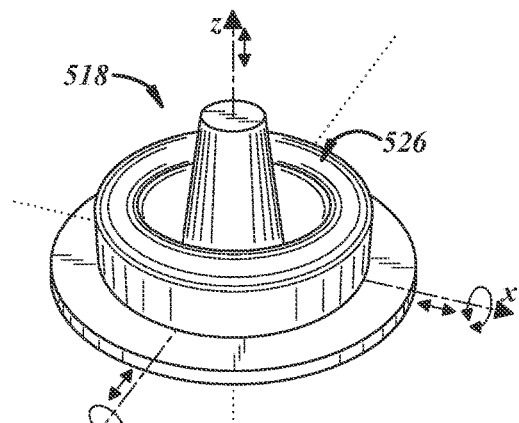
FIGS. 9A and 9B show a suspension component in accordance with one embodiment.
Figure 9B:
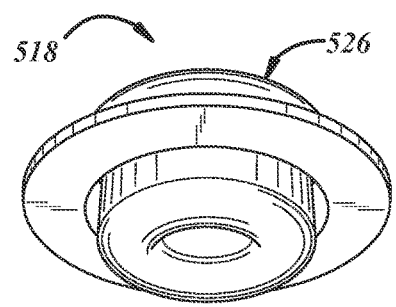
Figure 10:
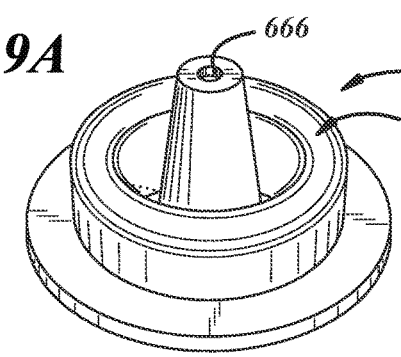
FIG. 10 is a perspective view of a suspension component in accordance with another embodiment.
Figure 11A:
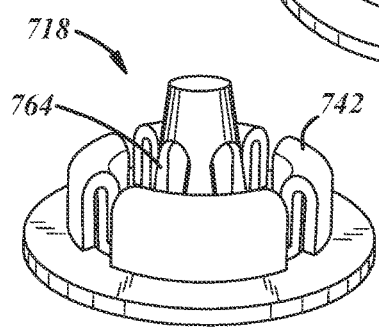
FIGS. 11A and 11B show a suspension component in accordance with another embodiment.
Figure 11B:
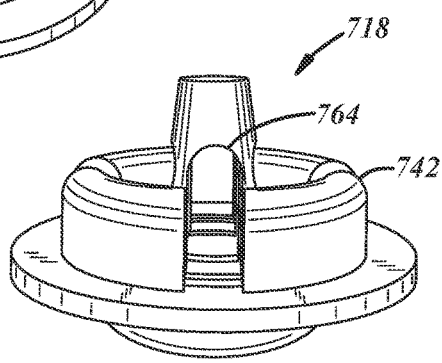
Figure 12:
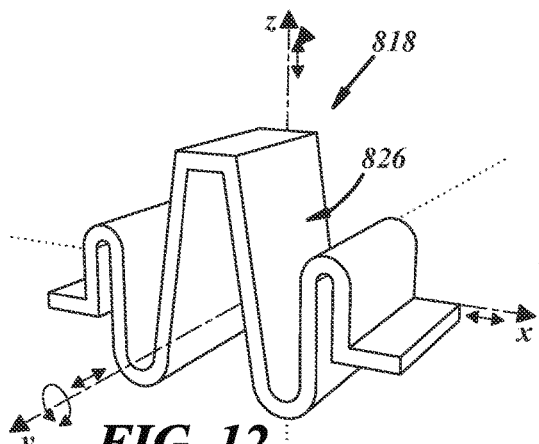
FIG. 12 is a perspective view of a suspension component in accordance with one embodiment.
Figure 13:
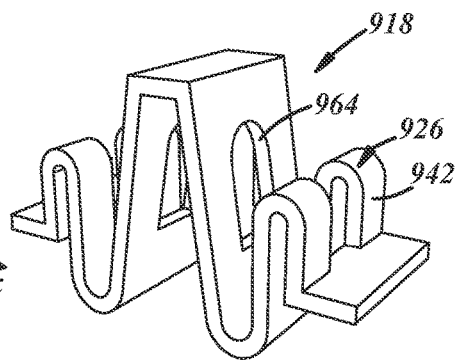
FIG. 13 is a perspective view of a suspension component in accordance with another embodiment.

FIG. 8 shows a partial, cross-sectional view of a suspension component 518, such as suspension component 518 of FIGS. 9A and 9B. It should be noted that FIG. 8 is also representative of the suspension components 618, 718, 818, 918 of FIGS. 10-13. As shown in FIG. 8, the transverse length of the mobility gap 536 varies in the axial direction because of the angle of the axial side wall 534 with relation to the touch panel interface 546. In this embodiment, the angle θ is larger than 90°. In a particular non-limiting example, the angle θ is approximately 98.7°. The suspension components represented by FIG. 8 have relatively smaller touch panel interfaces than the embodiments of FIGS. 1-7. More particularly, the proportions of the particular embodiment of FIG. 8 may be arrived at by decreasing dimension B of FIG. 3 by half and increasing the maximum transverse dimension C of the mobility gap 536 by the same amount. The axial dimensions F-I and transverse dimensions A, D, and E may remain unchanged from FIG. 3.

Similarly, the embodiments illustrated in FIGS. 9-13 have structural features generally corresponding to the embodiments of FIGS. 1-7 except the axial side walls extending between the concave sections and first ends of the respective flexible connectors are angled (i.e., non-perpendicular) with respect to the touch panel interface. For example, the suspension component 518 shown in FIGS. 9A and 9B generally corresponds with the suspension component 218 shown in FIGS. 5A and 5B, with a circular touch panel interface and a single flexible connector 526 extending circumferentially and continuously about the touch panel interface. The suspension component 618 shown in FIG. 10 generally corresponds with the suspension component 318 shown in FIG. 6, with a fastening hole 666 in the touch panel interface. The suspension component 718 shown in FIGS. 11A and 11B generally corresponds with the suspension component 418 shown in FIGS. 7A and 7B, with windows 764 formed through the axial side wall and a plurality of stabilizing protrusions 742. The suspension component 818 shown in FIG. 12 generally corresponds with the suspension component 18 shown in FIGS. 1-3, with a polygonal touch panel interface and a pair of identical and symmetrically oriented flexible connectors 826. The suspension component 918 shown in FIG. 13 generally corresponds with the suspension component 118 shown in FIG. 4, with windows 964 formed through the sidewalls of the connectors 926 and a plurality of stabilizing protrusions 942 in each connector.

Figure 14:
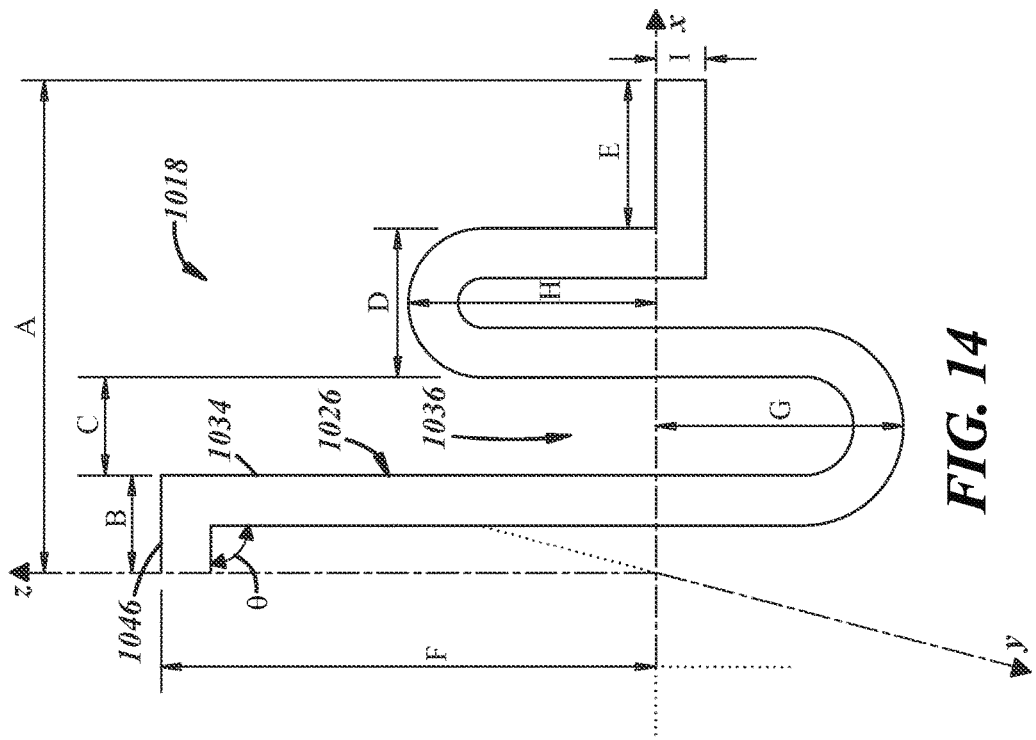
FIG. 14 is a partial, cross-sectional view representative of the suspension components shown in FIGS. 15 and 16.
Figure 15:
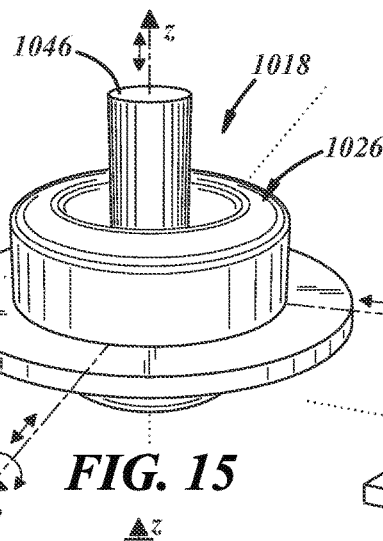
FIG. 15 is a perspective view of a suspension component in accordance with one embodiment.
Figure 16:
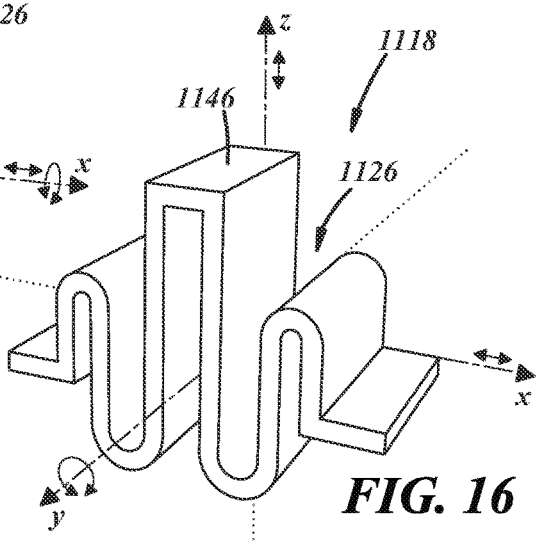
FIG. 16 is a perspective view of a suspension component in accordance with another embodiment.

FIG. 14 is a partial, cross-sectional view of another example of a suspension component 1018, such as the suspension component 1018 of FIG. 15. It should be noted that FIG. 14 is also representative of the suspension component 1118 shown in FIG. 16. These suspension components 1018, 1118 also have smaller touch panel interfaces 1046, 1146 than the embodiment of FIGS. 1-3. More particularly, the proportions of the particular embodiment of FIG. 14 may be arrived at by decreasing dimension B of FIG. 3 by half, decreasing the transverse dimension A by the same amount, and keeping all other transverse dimensions C-E and all axial dimensions F-I the same. The angle θ is approximately 90°, as with the embodiment of FIGS. 1-3.

Figure 17:
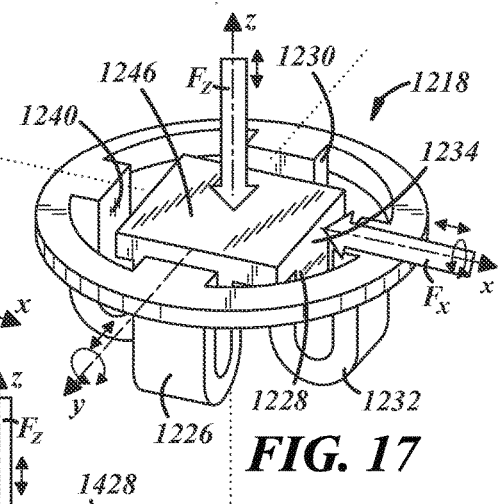
FIG. 17 is a perspective view of a suspension component in accordance with one embodiment.

FIG. 17 shows another suspension component 1218 capable of five DOF movement: along the X axis, around the X axis, along the Y axis, around the Y axis, and along the Z axis. In this example, a plurality of flexible connectors 1226 extends between first ends 1228 and second ends 1230 with concave sections 1232 and axial side walls 1234, 1240. The first and second ends each of the four flexible connectors 1226 are at the same axial position. Accordingly, in this example, the above-described first axial region defined axially between the first and second ends of the flexible connector, has an axial dimension of zero (F=0), such that the entire flexible connector 1226 lies outside the first axial region. The touch panel interface 1246 is square-shaped with the first ends of each of the four flexible connectors located along the respective four sides of the interface. This particular configuration has been modeled using finite element analysis, with the square touch panel interface having 8 mm sides, the mobility gap being 2 mm, and the flexible connectors having a 1 mm wall thickness and a width of 4 mm. The modeled material was POM (E=2850 MPa). An axial force Fz applied to the touch panel interface with the second ends of the flexible connectors in a fixed position yielded an axial displacement of 0.2 mm at an axial load of 90 N for an axial stiffness or spring constant of 450 N/mm. A transverse force Fx applied to the touch panel interface with the second ends of the flexible connectors in a fixed position yielded a displacement of 0.3 mm at a transverse load of 90 N, for a transverse stiffness or spring constant of 300 N/mm.

Figure 18:
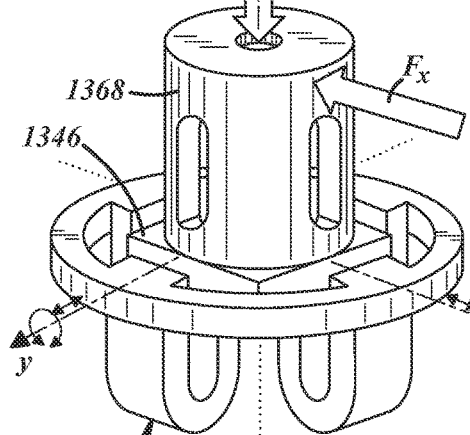
FIG. 18 is a perspective view of a suspension component in accordance with another embodiment.

FIG. 18 shows another suspension component 1318 capable of five DOF movement: along the X axis, around the X axis, along the Y axis, around the Y axis, and along the Z axis. This example is essentially the same as the example of FIG. 17, except that the suspension component further includes a spacer or extension 1368 extending in the axial direction from the touch screen interface 1346 that makes direct contact with the touch panel when assembled. In this example, the spacer 1368 is an integral or molded-in component of the suspension component 1318, but such a spacer could alternatively be provided on the back side of the touch panel. This particular configuration has been also been modeled using finite element analysis in the same POM material. The illustrated axial extension 1368 spaces the touch panel interface 1346 approximately 10 mm in the axial direction from the touch panel. An axial force Fz applied to the suspension component as shown, with the second ends of the flexible connectors in a fixed position, yielded an axial displacement of 0.12 mm at an axial load of 70 N for an axial spring constant of 580 N/mm. A transverse force Fx applied to the suspension component as shown, with the second ends of the flexible connectors in a fixed position, yielded a displacement of 0.8 mm at a transverse load of 90 N, for a transverse spring constant of 112.5 N/mm.

Figure 19:
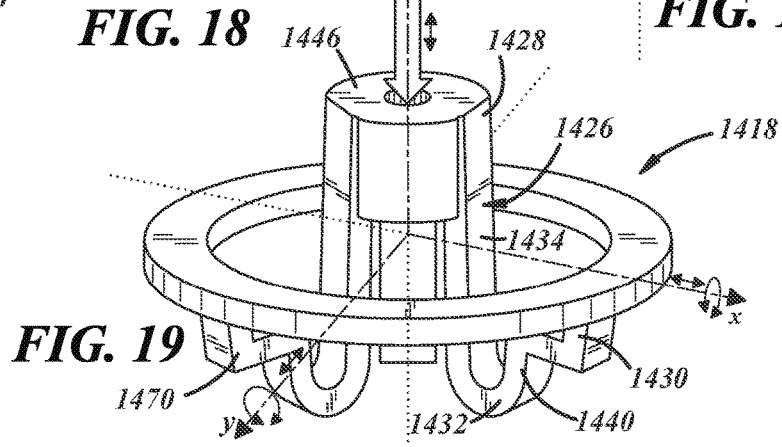
FIG. 19 is a perspective view of a suspension component in accordance with another embodiment.

FIG. 19 shows another suspension component 1418 also capable of five DOF movement: along the X axis, around the X axis, along the Y axis, around the Y axis, and along the Z axis. In this example, a plurality of flexible connectors 1426 extend between first ends 1428 and second ends 1430 with concave sections 1432 and axial side walls 1434, 1440. In this example, each flexible connector 1426 further includes an L-shaped portion 1470 between the second axial side wall 1440 and the second end 1430, and the first axial side walls 1434 form an angle θ>90° with the touch panel interface. The touch panel interface 1446 is circular with the first ends the three flexible connectors equally spaced about the perimeter of the touch panel interface. This particular configuration has been modeled using finite element analysis as well, with POM as the material. An axial force Fz applied to the touch panel interface 1446 with the second ends of the flexible connectors in a fixed position yielded an axial displacement of 1.1 mm at an axial load of 70 N for an axial spring constant of 63 N/mm.

FIGS. 20A and 20B show a suspension component 1518 in accordance with another embodiment. Suspension component 1518 includes a circular touch panel interface 1546 with only one flexible connector 1526. The suspension component 1518 is capable of three DOF movement: along the X axis, around the Y axis, and along the Z axis. As with other embodiments, this example includes an axially-facing concave section 1532 extending between axial side walls 1534 and 1540 with a mobility gap 1536 defined between opposing sides of the side walls. Similar to the embodiment of FIG. 18, an extension or spacer 1568 extends from the touch panel interface 1546 for attachment to the touch panel.

FIGS. 21A and 21B show a suspension component 1618 in accordance with another embodiment. The suspension component 1618 is capable of six DOF movement: along the X axis, around the X axis, along the Y axis, around the Y axis, along the Z axis, and around the Z axis. Here, the flexible connectors 1626 are arranged such that, when an axial force is applied to the touch panel interface, the touch panel interface rotates about the Z axis.

FIG. 22 illustrates another embodiment of the suspension component 1718. This example is similar to the embodiment illustrated in FIG. 17, with the first and second ends 1728, 1730 of the flexible connector 1726 generally located at the same axial position and the mobility gap 1736 defined between opposing side walls 1734, 1740. This example includes two flexible connectors 1726, with the first end 1728 of each connector located along opposite sides of a square-shaped or rectangular touch screen interface 1746. This particular component 1718 also includes spacers 1768 in the form of arc-shaped ribs extending from the interface 1746 to contact the touch panel when assembled. As with the embodiments of FIGS. 17-18, essentially the entire flexible connector lies outside of the region defined by the axial space between the first and second ends of the flexible connector, because that region consists of an x-y plane with no axial dimension in this case. This embodiment also has the same DOF as the examples of FIGS. 17-18. The particular configuration shown in FIG. 22 has been modeled using finite element analysis, with the touch panel interface having a diameter of 6.3 mm and an area of 31 mm$^2$, the mobility gap being 2.0 mm, and the flexible connectors having a 1.5 mm wall thickness and a width of 8.3 mm. The modeled material was PC/ABS (E=2200 MPa). An axial force applied to the touch panel interface with the second ends of the flexible connectors in a fixed position yielded an axial displacement of 0.68 mm at an axial load of 100 N for an axial stiffness or spring constant of 147 N/mm. A transverse force applied to the touch panel interface with the second ends of the flexible connectors in a fixed position yielded a displacement of 0.70 mm at a transverse load of 100 N, for a transverse stiffness or spring constant of 142 N/mm.

As evidenced by the appended drawings and accompanying descriptions the suspension components may take numerous forms. The desired stiffness and ranges of motion tolerances may be altered by changing the various structural features taught herein. A skilled artisan in possession of these teachings will now be able to tune a multiple DOF suspension component for use in a haptic touch panel assembly and take advantage of a nearly endless variety of different haptic feedback responses to effectively communication information to the user about the provided inputs— e.g., a different type of haptic feedback can be provided to correspond with different types of user inputs. Any combination of structural features, such as stabilizing protrusions or windows may be used, and any dimensional variations may be adjusted based on the haptic feedback response desired.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A suspension component for coupling a touch panel to a substrate in a haptic touch panel assembly, at least a portion of the touch panel being spaced from the substrate in an axial direction, the suspension component comprising:
a touch panel interface adapted for attachment to the touch panel and comprising an axially facing surface having an outer perimeter;
a substrate interface adapted for attachment to the substrate and comprising an annular axially facing surface having an inner perimeter radially spaced from the outer perimeter of the touch panel interface, the substrate interface being concentric with and parallel to the touch panel interface;
an annular flexible connector extending between a first end connected to the touch panel interface along the outer perimeter and a second end connected to the inner perimeter of the substrate interface, the first and second ends being radially spaced,
wherein the flexible connector includes:
an axial side wall comprising a first end extending from the touch panel interface and around the outer perimeter thereof,
an axially-facing concave section facing the touch panel interface and comprising a first end extending from a second end of the axial side wall, and
a plurality of separately formed circumferentially spaced stabilizing portions, each stabilizing portion comprising a first end coupled with a second end of the concave section and spaced about the touch panel interface and a second end connected to the substrate interface,
wherein a mobility gap is defined by the flexible connector and located between the axial sidewall and the substrate interface, whereby the flexible connector allows the touch panel to move with three or more degrees of freedom with respect to the substrate when coupled by the suspension component.

2. The suspension component of claim 1, wherein the concave section is a U-shaped portion having an open end facing in the axial direction.

3. The suspension component of claim 1, wherein the concave section is a U-shaped portion having an open end facing in the axial direction, and each stabilizing portion includes a U-shaped portion having an open end facing in an opposite axial direction.

4. The suspension component of claim 1, wherein the concave section includes a nadir, each stabilizing portion includes an apex, the nadir and apex being equidistant from the second end.

5. The suspension component of claim 1, wherein the concave section includes a nadir and the axial distance between the first end and the second end is greater than the axial distance between the nadir and the second end.

6. The suspension component of claim 1, wherein the flexible connector includes a second axial side wall between the concave section and said stabilizing portions such that the axial side walls are spaced apart in the transverse direction by the concave section to define the mobility gap.

7. The suspension component of claim 1, wherein at least a portion of the flexible connector lies outside an axial region defined between the first and second ends of the flexible connector.

8. The suspension component of claim 7, wherein each concave section includes a nadir that lies outside the axial region.

9. The suspension component of claim 1, wherein said three or more degrees of freedom includes five or more degrees of freedom.

10. A suspension component for coupling a touch panel to a substrate in a haptic touch panel assembly, at least a portion of the touch panel being spaced from the substrate in an axial direction, the suspension component comprising:
a touch panel interface adapted for attachment to the touch panel and comprising an axially facing surface having an outer polygonal perimeter having a plurality of sides;

a plurality of substrate interfaces adapted for attachment to the substrate and each comprising an axially facing surface having an inner side radially spaced from the outer perimeter of the touch panel interface, the substrate interfaces being parallel to the touch panel interface, equally spaced about the outer perimeter, and equally spaced radially from the outer perimeter; and a plurality of flexible connectors equally spaced about the perimeter of the touch panel interface, each flexible connector extending between one of the sides of the polygonal perimeter and one of the substrate interfaces, each flexible connector comprising:

a first end connected to the perimeter of the touch panel interface;

a second end spaced from the first end in a transverse direction that is perpendicular to the axial direction and connected to the inner side of a respective one of the substrate interfaces;

an axial side wall comprising a first end extending from the touch panel interface;

an axially-facing concave section facing the touch panel interface and comprising a first end extending from a second end of the axial side wall;

a radially outward portion comprising a first end extending from a second end of the concave section and a second end connected to the substrate interface; and a mobility gap defined between the axial sidewall and the respective substrate interface, whereby the plurality of flexible connectors together allow the touch panel to move with three or more degrees of freedom with respect to the substrate when coupled by the suspension component, wherein one of the degrees of freedom is a rotational degree of freedom about an axis that is perpendicular to the axial and transverse directions.

11. The suspension component of claim 10, wherein said three or more degrees of freedom includes five or more degrees of freedom.

12. The suspension component of claim 10, wherein each concave section has an open end facing in the axial direction and each radially outward portion comprises a stabilizing portion comprising a first end coupled with the second end of the concave section and a second end connected to the substrate interface, each stabilizing portion being concave and having an open end facing in an opposite axial direction.

13. The suspension component of claim 12, wherein each flexible connector includes a second axial side wall between the concave section and said stabilizing portion such that the axial side walls are spaced apart in the transverse direction by the concave section to define the mobility gap.

14. The suspension component of claim 10, wherein the touch panel interface is rectangular with one of the flexible connectors on one side of the rectangle and another of the flexible connectors on an opposite side of the rectangle.

15. The suspension component of claim 10, wherein the first and second ends of each flexible connector are located at the same axial position.

16. The suspension component of claim 10, wherein at least a portion of each flexible connector lies outside an axial region defined between the first and second ends of the flexible connector.

17. The suspension component of claim 10, wherein the degrees of freedom further include a translational degree of freedom along the axial direction and a translational degree of freedom along the transverse direction.

18. The suspension component of claim 10 integrally molded with a substrate of a haptic touch panel assembly such that each of the plurality of substrate interfaces is integral with the substrate.

* * * * *